(12) United States Patent
Visbal et al.

(10) Patent No.: US 9,853,323 B2
(45) Date of Patent: Dec. 26, 2017

(54) POSITIVE ELECTRODE FOR LITHIUM-ION SECONDARY BATTERY, AND LITHIUM-ION SECONDARY BATTERY

(71) Applicant: Samsung Electronics Co., Ltd., Suwon-si, Gyeonggi-Do (KR)

(72) Inventors: Heidy Visbal, Nara (JP); Yuichi Aihara, Mino (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 195 days.

(21) Appl. No.: 14/529,486

(22) Filed: Oct. 31, 2014

(65) Prior Publication Data

US 2015/0118574 A1 Apr. 30, 2015

(30) Foreign Application Priority Data

Oct. 31, 2013 (JP) .................................. 2013-227115
Jul. 11, 2014 (KR) ......................... 10-2014-0087321

(51) Int. Cl.
*H01M 10/0562* (2010.01)
*H01M 4/62* (2006.01)
*H01M 10/0525* (2010.01)
*H01M 4/131* (2010.01)
*H01M 4/36* (2006.01)
*H01M 10/052* (2010.01)
(Continued)

(52) U.S. Cl.
CPC ....... *H01M 10/0562* (2013.01); *H01M 4/131* (2013.01); *H01M 4/366* (2013.01); *H01M 4/62* (2013.01); *H01M 10/052* (2013.01); *H01M 4/525* (2013.01); *H01M 2004/028* (2013.01); *H01M 2300/0068* (2013.01); *Y02T 10/7011* (2013.01)

(58) Field of Classification Search
CPC ....................... H01M 10/052; H01M 10/0562
See application file for complete search history.

(56) References Cited

U.S. PATENT DOCUMENTS 6,277,524 B1   8/2001   Kanno
6,764,791 B2 * 7/2004   Tamura ................. H01M 4/134
                                                                429/231.4

(Continued)

FOREIGN PATENT DOCUMENTS

EP          1786052 B1      9/2012
JP       2003-292309    * 10/2003  .............. H01M 4/02
(Continued)

OTHER PUBLICATIONS

Julien et al., Characterization of the carbon coating onto LiFePO4 particles used in lithium batteries, J. Appl. Phys. 100, 063511 (Sep. 22, 2006).*

(Continued)

*Primary Examiner* — Osei Amponsah
(74) *Attorney, Agent, or Firm* — Cantor Colburn LLP

(57) ABSTRACT

A positive electrode for a lithium-ion secondary battery includes a positive electrode particle including a positive active material including a lithium salt, and a coating layer including an amorphous carbonaceous layer on a surface of the positive active material, and a sulfide solid electrolyte contacting the coating layer, wherein the sulfide solid electrolyte includes a solid sulfide.

21 Claims, 9 Drawing Sheets

(51) Int. Cl.
*H01M 4/525* (2010.01)
*H01M 4/02* (2006.01)

(56) References Cited

U.S. PATENT DOCUMENTS

| | | | |
|---|---|---|---|
| 8,785,051 B2* | 7/2014 | Mochida | H01M 4/131 |
| | | | 429/209 |
| 2007/0160911 A1 | 7/2007 | Senga et al. | |
| 2008/0210950 A1* | 9/2008 | Sung | H01L 31/022466 |
| | | | 257/77 |
| 2009/0061288 A1 | 3/2009 | Gordon et al. | |
| 2009/0229700 A1 | 9/2009 | Nakamura et al. | |
| 2009/0269670 A1 | 10/2009 | Tsuchida | |
| 2010/0035157 A1 | 2/2010 | Nakamura | |
| 2010/0273062 A1 | 10/2010 | Tsuchida et al. | |
| 2010/0297504 A1 | 11/2010 | Oki et al. | |
| 2011/0027661 A1 | 2/2011 | Okazaki et al. | |
| 2011/0045348 A1 | 2/2011 | Kubo et al. | |
| 2011/0049745 A1 | 3/2011 | Katayama et al. | |
| 2011/0129723 A1 | 6/2011 | Tsuchida | |
| 2011/0162198 A1 | 7/2011 | Kawamoto et al. | |
| 2011/0165466 A1 | 7/2011 | Zhamu et al. | |
| 2011/0177370 A1 | 7/2011 | Kawamoto | |
| 2011/0195315 A1 | 8/2011 | Tsuchida et al. | |
| 2012/0021298 A1 | 1/2012 | Maeda | |
| 2012/0034529 A1 | 2/2012 | Tatsumisago et al. | |
| 2012/0052382 A1 | 3/2012 | Yoshida et al. | |
| 2012/0064400 A1 | 3/2012 | Takada et al. | |
| 2012/0091391 A1 | 4/2012 | Tsuchida et al. | |
| 2012/0094194 A1 | 4/2012 | Visco et al. | |
| 2012/0115039 A1 | 5/2012 | Ouchi et al. | |
| 2012/0141882 A1 | 6/2012 | Ota et al. | |
| 2012/0231348 A1 | 9/2012 | Ohtomo et al. | |
| 2012/0231350 A1 | 9/2012 | Nishida et al. | |
| 2012/0301778 A1 | 11/2012 | Trevery et al. | |
| 2012/0301796 A1 | 11/2012 | Ohtomo et al. | |
| 2013/0026409 A1 | 1/2013 | Baker et al. | |
| 2013/0040208 A1 | 2/2013 | Kanno et al. | |
| 2013/0059209 A1 | 3/2013 | Ota et al. | |
| 2013/0065135 A1 | 3/2013 | Takada et al. | |
| 2013/0097854 A1 | 4/2013 | Kato et al. | |
| 2013/0122398 A1 | 5/2013 | Birke et al. | |
| 2015/0093652 A1 | 4/2015 | Aihara et al. | |

FOREIGN PATENT DOCUMENTS

| | | |
|---|---|---|
| JP | 2006049037 A | 2/2006 |
| JP | 2010040439 A | 2/2010 |
| JP | 2011044368 A | 3/2011 |
| JP | 2011140605 A | 7/2011 |
| JP | 4982866 B2 | 5/2012 |
| JP | 201389321 A | 5/2013 |
| JP | 5304796 B2 | 7/2013 |
| JP | 5349427 B2 | 8/2013 |
| JP | 5423725 B2 | 12/2013 |
| JP | 5445148 B2 | 1/2014 |
| KR | 100511232 B1 | 8/2005 |
| KR | 1020150039550 A | 4/2015 |
| WO | 2011052094 A1 | 5/2011 |
| WO | 2011074097 A1 | 6/2011 |
| WO | 2011086689 A1 | 7/2011 |
| WO | 2012/161473 A2 | 11/2012 |

OTHER PUBLICATIONS

Hee-Soo Moon et al., Characterization of protective-layer-coated LiMn2O4 cathode thin films, Journal of Power Sources, vols. 119-121, Jun. 1, 2003, pp. 713-716.*

Arie et al., "Electrochemical characteristics of lithium metal anodes with diamond like carbon film coating layer", Diamond & Related Materials, vol. 20, 2011, pp. 403-408.

Takada et al., "Progress and prospective of solid-state lithium batteries", Acta Materialia 61, 2013, pp. 759-770.

* cited by examiner

POSITIVE ELECTRODE FOR LITHIUM-ION SECONDARY BATTERY, AND LITHIUM-ION SECONDARY BATTERY

RELATED APPLICATIONS

This application claims priority to and the benefit of Japanese Patent Application No. 2013-227115, filed on Oct. 31, 2013, in the Japanese Patent Office, and Korean Patent Application No. 10-2014-0087321, filed on Jul. 11, 2014, in the Korean Intellectual Property Office, the contents of both of which are incorporated herein by reference in their entirety.

BACKGROUND

1. Field

The present disclosure relates to a positive electrode for a lithium-ion secondary battery and a lithium-ion secondary battery including the positive electrode.

2. Description of the Related Art

Recently, all-solid-state lithium-ion secondary batteries, including a solid electrolyte having lithium-ion conductivity as an electrolyte, have drawn attention.

Much attention has been paid to sulfide-based solid electrolytes as solid electrolytes of lithium-ion secondary batteries to provide improved lithium-ion conductivity. Nonetheless the remains a need for an improved solid electrolyte, and an all solid-state lithium-ion secondary battery including the same.

SUMMARY

Provided is a positive electrode for a lithium-ion secondary battery including a sulfide-based solid electrolyte which is capable of inhibiting a reaction at an interface between a positive active material and the sulfide-based solid electrolyte.

Provided is a lithium-ion secondary battery including the positive electrode.

Additional aspects will be set forth in part in the description which follows and, in part, will be apparent from the description.

According to an aspect, a positive electrode of a lithium-ion secondary battery includes: a positive electrode particle including a positive active material including a lithium salt; and a coating layer including an amorphous carbonaceous layer on a surface of the positive active material, wherein the sulfide solid electrolyte includes a solid sulfide.

The coating layer may include a deposition product of an aliphatic hydrocarbon, an aromatic hydrocarbon, or any combination thereof.

The coating layer may include a deposition product of acetylene, methane, benzene, toluene, xylene, naphthalene, cyclohexane, or combination thereof.

The coating layer may include a deposition product of an alicyclic hydrocarbon of the formula $C_{4n+6}H_{4n+12}$, where n is a positive integer.

The coating layer may include diamond-like carbon.

The coating layer may include hydrogen atoms, wherein an amount of the hydrogen atoms is in the range of about 1 at % to about 50 at %, based on a total content of the coating layer.

The coating layer may include $sp^2$ hybridized carbon atoms and $sp^3$ hybridized carbon atoms, and a content of the $sp^3$ hybridized carbon atoms in the coating layer may be in the range of about 10% to about 100%, based on a total carbon content of the coating layer.

The coating layer may be formed by plasma-enhanced chemical vapor deposition ("CVD") or physical vapor deposition ("PVD").

The sulfide-based solid electrolyte may be in the form of particles.

The sulfide-based solid electrolyte may include sulfur and lithium, and further includes phosphorus (P), silicon (Si), boron (B), aluminum (Al), germanium (Ge), zinc (Zn), gallium (Ga), indium (In), a halogen element, or a combination thereof.

The sulfide-based solid electrolyte may include: lithium sulfide; and silicon sulfide, phosphorus sulfide, boron sulfide, or a combination thereof.

According to another aspect, a lithium-ion secondary battery includes: a positive electrode layer including a positive electrode particle including a positive active material including a lithium salt, and a coating layer including an amorphous carbonaceous layer on a surface of the positive active material; a negative electrode layer including a negative active material; and a sulfide solid electrolyte layer disposed between the positive electrode layer, wherein the sulfide solid electrolyte layer includes a sulfide solid electrolyte including a solid sulfide.

Here, the coating layer is as described above.

The positive active material may include a lithium salt of a transition metal oxide having a layered rock-salt type structure.

The lithium salt of the transition metal oxide having a layered rock-salt type structure may be $LiNi_xCo_yAl_zO_2$ or $LiNi_xCo_yMn_zO_2$, where $0<x<1$, $0<y<1$, $0<z<1$, and $x+y+z=1$.

The sulfide-based solid electrolyte may include sulfur and lithium, and further include phosphorus (P), silicon (Si), boron (B), aluminum (Al), germanium (Ge), zinc (Zn), gallium (Ga), indium (In), a halogen element, or a combination thereof.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
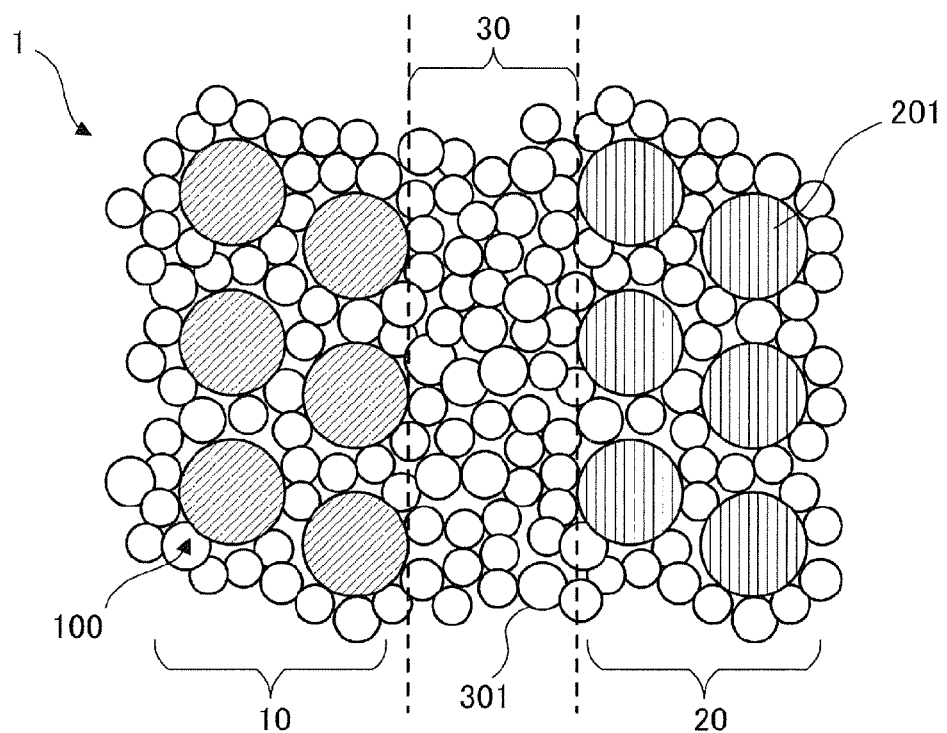
FIGS. 1A and 1B are schematic diagrams of an embodiment of a lithium-ion secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Sulfide-based solid electrolytes have drawn attention because they can provide improved conductivity. However, when a sulfide-based solid electrolyte is used, a reaction may occur at an interface between a positive active material and a solid electrolyte, for example, while charging a lithium-ion secondary battery, to generate a resistive component at the interface. When the resistive component is generated at the interface between the positive active material and the solid electrolyte, a resistance (e.g., an interface resistance) against movement of lithium ions through the interface between the positive active material and the solid electrolyte increases. Due to the increase in resistance, lithium-ion conductivity decreases, and thus, the output of the lithium-ion secondary battery may decrease. Therefore, there is a need to develop a method of reducing generation of the resistive components at the interface between the positive active material and the solid electrolyte by inhibiting reactions at the interface and improving characteristics of the lithium-ion secondary battery.

"Alkali metal" means a metal of Group 1 of the Periodic Table of the Elements, i.e., lithium, sodium, potassium, rubidium, cesium, and francium.

"Alkaline-earth metal" means a metal of Group 2 of the Periodic Table of the Elements, i.e., beryllium, magnesium, calcium, strontium, barium, and radium.

"Transition metal" as defined herein refers to an element of Groups 3 to 11 of the Periodic Table of the Elements.

"Rare earth" means the fifteen lanthanide elements, i.e., atomic numbers 57 to 71, plus scandium and yttrium.

The "lanthanide elements" means the chemical elements with atomic numbers 57 to 71.

A 1 C rate means a current which will discharge a battery in one hour, e.g., a 1 C rate for a battery having a discharge capacity of 1.6 ampere-hours would be 1.6 amperes.

Structure of Lithium-Ion Secondary Battery 1

Figure 1B:
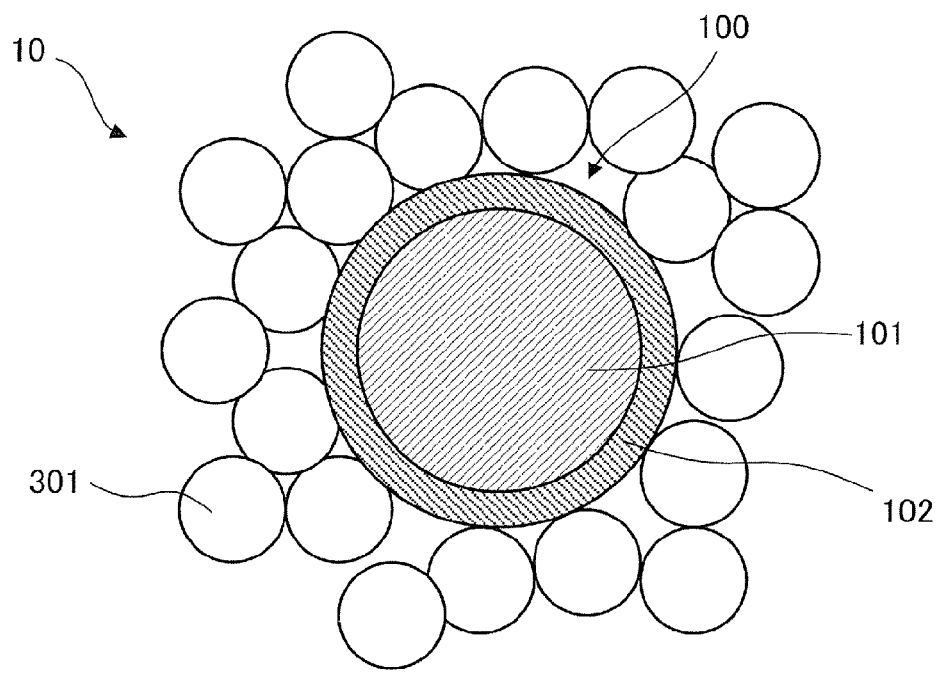

FIGS. 1A and 1B are schematic diagrams of an embodiment of a lithium-ion secondary battery 1. FIG. 1A is a schematic cross-sectional view of a layered structure of the lithium-ion secondary battery 1, and FIG. 1B is a schematic cross-sectional view of a positive electrode particle 100 of the lithium-ion secondary battery 1.

The lithium-ion secondary battery 1 according to the illustrated embodiment is an all-solid-state battery including a solid electrolyte as an electrolyte. As illustrated in FIG. 1A, the lithium-ion secondary battery 1 has a layered structure including a positive electrode layer 10, a negative electrode layer 20, and a solid electrolyte layer 30 interposed between the positive electrode layer 10 and the negative electrode layer 20.

Positive Electrode Layer 10

As illustrated in FIG. 1A, the positive electrode layer 10 includes a positive electrode particle 100 and a solid electrolyte 301. The solid electrolyte layer 30 comprises the solid electrolyte 301. The solid electrolyte layer 30 and the solid electrolyte 301 will be described in further detail below.

Positive Electrode Particle 100

As illustrated in FIG. 1B, the positive electrode particle 100 includes a positive active material 101 and a coating layer 102 disposed on, e.g., covering, a surface of the positive active material 101. Hereinafter, the positive active material 101 and the coating layer 102 will be described in further detail.

Positive Active Material 101

The positive active material 101 comprises a material having a higher charge-discharge potential than that of a negative active material 201, which will be further described below, and provides for reversible intercalation and deintercalation of lithium ions.

The positive active material 101 may comprise any suitable active material used in the art, without limitation. Examples of the positive active material 101 may include a compound represented by the following formulas, or a combination thereof: $Li_aA_{1-b}M_bD_2$ (where $0.90 \leq a \leq 1$ and $0 \leq b \leq 0.5$); $Li_aE_{1-b}M_bO_{2-c}D_c$ (where $0.90 \leq a \leq 1$, $0 \leq b \leq 0.5$, and $0 \leq c \leq 0.05$); $LiE_{2-b}M_bO_{4-c}D_c$ (where $0 \leq b \leq 0.5$ and $0 \leq c \leq 0.05$); $Li_aNi_{1-b-c}Co_bM_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bM_cO_{2-\alpha}X_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bM_cO_{2-\alpha}X_2$ (where $0.90 \leq a \leq 1$, $0 \leq b \leq 0.5$, $0 \leq c \leq 0.05$, and $0 < \alpha < 2$); $Li_aNi_{1-b-c}Mn_bM_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bM_cO_{2-\alpha}X_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bM_cO_{2-\alpha}X_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiM'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulas above, A is nickel (Ni), cobalt (Co), manganese (Mn), or any combination thereof; M is aluminum (Al), nickel (Ni), cobalt (Co), manganese (Mn), chromium (Cr), iron (Fe), magnesium (Mg), strontium (Sr), vanadium (V), a rare earth element, or any combination thereof; D is oxygen (O), fluorine (F), sulfur (S), phosphorus (P), or any combination thereof; E is cobalt (Co), manganese (Mn), or any combination thereof; X is fluorine (F), sulfur (S), phosphorus (P), or any combination thereof; G is aluminum (Al), chromium (Cr), manganese (Mn), iron (Fe), magnesium (Mg), lanthanum (La), cerium (Ce), strontium (Sr), vanadium (V), or any combination thereof; Q is titanium (Ti), molybdenum (Mo), manganese (Mn), or any combination thereof; M' is chromium (Cr), vanadium (V), iron (Fe), scandium (Sc), yttrium (Y), or any combination thereof; and J is vanadium (V), chromium (Cr), manganese (Mn), cobalt (Co), nickel (Ni), copper (Cu), or any combination thereof.

The coating layer 102 may be disposed on a surface of the positive active material 101, or the positive active material may be mixed with another compound including a coating layer for use. The coating layer may include a compound of a coating element such as an oxide, hydroxide, oxyhydroxide, oxycarbonate, and hydroxycarbonate of the coating element. Compounds constituting the coating layer may be amorphous or crystalline. A coating element contained in the coating layer may be Mg, Al, Co, K, Na, Ca, Si, Ti, V, Sn, Ge, Ga, B, As, Zr, or a combination thereof. A method of forming the coating layer may be any suitable method using the coating element so long as the method and the compound do not adversely affect the properties of the positive active material. The method may comprise, for example, a spray coating method or an immersion method, the details of which can be determined by one of skill in the art without undue experimentation, and thus are not further elaborated on herein.

Examples of the positive active material 101 include a lithium salts such as lithium cobalt oxide ("LCO"), lithium nickel oxide, lithium nickel cobalt oxide, lithium nickel cobalt aluminum oxide ("NCA"), lithium nickel cobalt manganese oxide ("NCM"), lithium manganate, and lithium iron phosphate, and nickel sulfide, copper sulfide, sulfur, iron oxide, vanadium oxide, and the like. The positive active material 101 may be used alone or in a combination thereof.

The positive active material 101 may include a lithium salt of a transition metal oxide having a layered rock-salt type structure. As used herein, the term "layered" refers to a shape of a thin sheet, and the expression "rock-salt type structure" refers to a sodium chloride-type structure as a crystal structures in which face-centered cubic lattices respectively formed of anions and cations are shifted by half the side of each unit lattice.

Examples of the lithium salt of a transition metal oxide having a layered rock-salt type structure may be a lithium salt of a ternary transition metal oxide represented by the formula $LiNi_xCo_yAl_zO_2$ ("NCA"), wherein $0<x<1$, $0<y<1$, $0<z<1$, and $x+y+z=1$, or $LiNi_xCo_yMn_zO_2$ ("NCM"), wherein $0<x<1$, $0<y<1$, $0<z<1$, and $x+y+z=1$.

As is further disclosed above, when the lithium salt of the ternary transition metal oxides having a layered rock-salt type structure is used as the positive active material 101, the lithium-ion secondary battery 1 may have high energy density and excellent thermal stability.

In addition, a particle of a lithium salt of the ternary transition metal oxide such as NCA or NCM has a smaller particle diameter than a particle of LCO and the like, thereby having a greater specific surface area (about 10 times) than the particle of LCO, and the like. Accordingly, a contact area between the positive electrode particle 100 and the solid electrolyte 301 may be increased. Thus, while reactions between the positive active material 101 and the solid electrolyte 301 are inhibited by using the coating layer 102, the lithium-ion conductivity between the positive electrode particle 100 (including the positive active material 101) and the solid electrolyte 301 may be improved, compared with when the coating layer 102 is not used, and thus the lithium-ion secondary battery 1 may have improved power output.

In addition, when a lithium salt of the ternary transition metal oxide having a layered rock-salt type structure is used as the positive active material 101, the positive active material 101 can comprise Ni. In this case, the lithium-ion secondary battery 1 has improved capacity density and elution of metal may be reduced during charging. Thus, the long-term reliability of the lithium-ion secondary battery 1 in a charged state may be improved, thereby improving cycle characteristics of the lithium-ion secondary battery 1.

The positive active material 101 may be in the form of particles, and may have a shape such as a spherical shape or an oval shape. When the positive active material 101 is in the form of particles, an average particle diameter thereof may be in the range of about 0.1 micrometers (μm) to about 50 μm. Here, the "average particle diameter" refers to a number average particle diameter in the distribution of particle diameters obtained by a light scattering method and may be measured by a particle diameter distribution meter and the like.

In the positive electrode layer 10, an amount of the positive active material 101 may be in the range of about 10% by weight to about 99% by weight, for example, in the range of about 20% by weight to about 90% by weight, based on a total weight of the positive electrode layer.

Coating Layer 102

The coating layer 102 is disposed on the surface of the positive active material 101. The coating layer 102 substantially or effectively prevents direct contact between the positive active material 101 and the solid electrolyte 301. While not wanting to be bound by theory, it is understood that because the coating layer 102 prevents direct contact between the positive active material and the solid electrolyte, a reaction between the positive active material and the solid electrolyte at the interface between the positive active material 101 and the solid electrolyte 301 is inhibited or prevented.

According to an embodiment, the coating layer 102 comprises an amorphous carbonaceous layer. In an embodiment, the amorphous carbonaceous layer does not include lithium ions. In this regard, the amorphous carbonaceous layer comprises, e.g., consists essentially of, or consists of, carbon or a layer including carbon as a primary component and has an amorphous structure comprising a non-uniform combination of carbon atoms which are bonded to each other by $sp^3$ hybrid orbitals, corresponding to the structure of diamond, and carbon atoms bonded to each other by $sp^2$ hybrid orbitals, corresponding to the structure of graphite. In addition, in the following description, a bond formed by the $sp^3$ hybrid orbitals may be referred to as an $sp^3$ hybrid bond and a bond formed by the $sp^2$ hybrid orbitals may be referred to as an $sp^2$ hybrid bond.

The coating layer 102 may further include any atom such as hydrogen or silicon in addition to carbon so long as the coating layer 102 includes carbon as a primary component. The carbon content of the coating layer 102 may be 50 weight percent (wt %) to 99.99 wt %, or 60 wt % to 99 wt %, based on a total content of the coating layer.

The amorphous carbonaceous layer used as the coating layer 102 may include a deposition product of an aliphatic hydrocarbon, an aromatic hydrocarbon, or a combination thereof.

According to an embodiment, the coating layer 102 may include a deposition product of acetylene, methane, benzene, toluene, xylene, naphthalene, cyclohexane, or a combination thereof.

According to an embodiment, the coating layer 102 may include a deposition product of an alicyclic hydrocarbon represented by the formula $C_{4n+6}H_{4n+12}$ (wherein n is a positive integer, e.g., 1 to 20). Examples of the alicyclic hydrocarbon represented by $C_{4n+6}H_{4n+12}$ may include adamantane, diamantane, triamantane, tetramantane, pentamantane, hexamantane, heptamantane, octamantane, nonamantane, decamantane, undecamantane, and the like, without being limited thereto.

According to an embodiment, the coating layer 102 may include diamond like carbon ("DLC").

In the coating layer 102, the amorphous carbonaceous layer may include hydrogen atoms. For example, when DLC is used to form the amorphous carbonaceous layer constituting the coating layer 102, hydrogen atom-containing DLC may be used. An amount of the hydrogen atoms contained in the amorphous carbonaceous layer may be in the range of about 1 atomic percent (at %) to about 50 at %, for example, in the range of about 10 at % to about 30 at %, based on a total content of the coating layer. Within the range describe above, the stability of the coating layer 102 does not deteriorate.

A thickness of the coating layer 102 may be in the range of about 1 nanometer (nm) to about 100 nm. For example, the thickness of the coating layer 102 may be in the range of about 5 nm to about 20 nm. When the thickness of the coating layer 102 is within the range described above, the lithium-ion conductivity may not be reduced and reactions in the interface between the solid electrolyte 301 and the positive active material 101 may be efficiently inhibited. The thickness of the coating layer 102 may be measured using a transmission electron microscopic ("TEM") image of the positive electrode particle 100.

The amorphous carbonaceous layer used to provide the coating layer 102 may include carbon atoms bonded to each other by $sp^2$ hybrid bonds ($sp^2$ hybridized carbon atoms) and carbon atoms bonded to each other by $sp^3$ hybrid bonds ($sp^3$ hybridized carbon atoms). According to an embodiment, the coating layer 102 may include $sp^2$ hybridized carbon-carbon bonds, $sp^3$ hybridized carbon-carbon bonds, $sp^2$ hybridized carbon-hydrogen bonds, and $sp^3$ hybridized carbon-hydrogen bonds.

When DLC is used to form the coating layer 102, a content of the $sp^3$ hybridized carbon atoms among carbon atoms contained in the DLC may be in the range of about 10% to about 100%, for example, in the range of about 30% to about 70%, or in the range of about 40% to about 60%, based on a total carbon content of the amorphous carbonaceous layer. Alternatively, a content of the $sp^3$ hybridized carbon atoms among all carbon atoms contained in the coating layer may be in the range of about 10% to about 100%, for example, in the range of about 30% to about 70%, or in the range of about 40% to about 60%, based on a total carbon content of the coating layer. When the content of the $sp^3$ hybridized carbon atoms contained in the amorphous carbonaceous layer is within the range describe above, a reaction between the positive active material 101 and the solid electrolyte 301 may be efficiently inhibited, the lithium-ion conductivity of the coating layer 102 may be improved, and discharge capacity, load characteristics, and cycle characteristics of the lithium-ion secondary battery 1 may be improved.

In this regard, a ratio of the $sp^2$ hybridized carbon atoms to the $sp^3$ hybridized carbon atoms contained in the DLC used to form the coating layer 102 may be obtained using Electron Energy-Loss Spectroscopy ("EELS") by using a transmission electron microscope ("TEM").

Hereinafter, a method of calculating a ratio of $sp^2$ hybridized carbon atoms to $sp^3$ hybridized carbon atoms contained in the coating layer 102 will be described in further detail.

Figure 2:
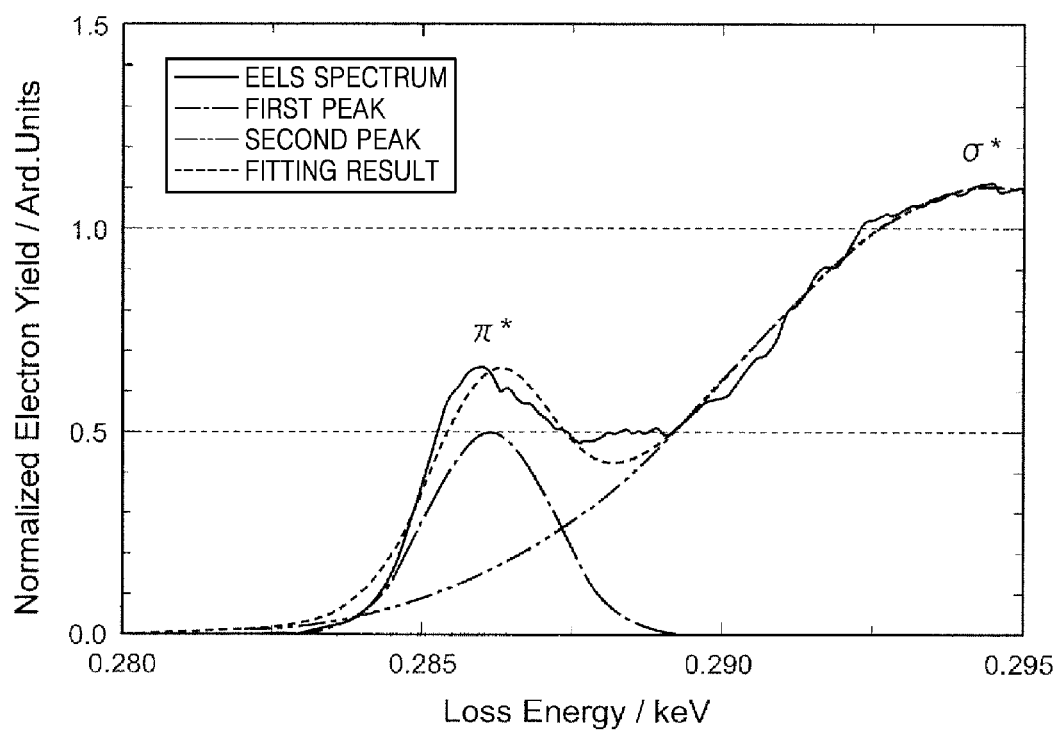
FIG. 2 is a graph of normalized electron yield (arbitrary units) versus loss energy (kiloelectron volts, keV) showing the results of TEM-EELS analysis of a coating layer of a positive electrode particle, and a fitting result thereof.

FIG. 2 is a graph showing the results of TEM-EELS analysis of the coating layer 102 of the positive electrode particle 100, and a fitting result thereof. In addition, DLC is used to form the coating layer 102 according to the embodiment illustrated in FIG. 2. In addition, FIG. 2 illustrates an electron energy range of 0.280 kiloelectron volts (keV) to 0.295 keV in the EELS spectrum of K-electron energy loss near edge structure of carbon. In FIG. 2, the x-axis indicates loss energy (keV), and the y-axis indicates intensity of the spectrum.

In FIG. 2, the solid line indicates an EELS spectrum of the coating layer 102. As shown with the solid line in FIG. 2, the EELS spectrum of DLC has peaks respectively in a range of 0.284 keV to 0.286 keV and in a range of 0.292 keV to 0.295 keV. In addition, in the following description, the peak shown in the range of 0.284 keV to 0.286 keV is referred to as a first peak, and the peak shown in the range of 0.292 keV to 0.295 keV is referred to as a second peak.

In this regard, in the EELS spectrum of DLC, the first peak corresponds to a $\pi$-bond of carbon atoms, and the second peak corresponds to an $\sigma$-bond of carbon atoms.

First, in FIG. 2, the first and second peaks are separated from the EELS spectrum shown as the solid line. In addition, in FIG. 2, a curve shown with a dash-dotted line corresponds to the separated first peak and a curve shown with a dash-double-dotted line corresponds to the separated second peak. In addition, in FIG. 2, a curve shown with a dashed line corresponds to an EELS spectrum fitted by using the separated first and second peaks.

Then, an intensity ratio of the separated first peak to the separated second peak (peak area ratio, i.e., area of peak 1/area of peak 2) is calculated.

In addition, although not shown in the drawings, an EELS spectrum of each of diamond and graphite is measured, a first peak and a second peak are separated therefrom, and a peak area ratio of the separated first peak to the separated second peak is calculated.

In this regard, carbon atoms contained in diamond are bonded to each other by $sp^3$ hybrid bonds, and carbon atoms contained in graphite are bonded to each other by $sp^2$ hybrid bonds.

Thus, a relative value of the peak area ratio of the first peak to the second peak in DLC may be calculated by setting the peak area ratio of the first peak to the second peak in diamond as 0 and setting the peak area ratio of the first peak to the second peak in graphite as 100. Accordingly, a ratio of the $sp^2$ hybridized carbon atoms to the $sp^3$ hybridized carbon atoms (here, a content of $sp^2$ hybridized carbon atoms (%)) may be calculated.

Table 1 shows results of the EELS spectrum of DLC illustrated in FIG. 2.

TABLE 1

| | Peak area | | Area ratio | | |
|---|---|---|---|---|---|
| | First peak | Second peak | First peak/second peak | Relative value | $sp^2:sp^3$ |
| Coating layer (DLC) | 1.27 | 23.83 | 0.053 | 51 | 51:49 |
| Graphite | 2.33 | 23.41 | 0.100 | 100 | 100:0 |
| Diamond | 0.11 | 21.91 | 0.005 | 0 | 0:100 |

As shown in Table 1, according to the embodiment illustrated in FIG. 2, the relative value of the peak area ratio is 51. Thus, it may be confirmed that the $sp^2$ hybridized carbon atoms and the $sp^3$ hybridized carbon atoms are contained in the DLC in a ratio of 51:49 ($sp^2:sp^3$).

The method of calculating the ratio of the $sp^2$ hybridized carbon atoms to the $sp^3$ hybridized carbon atoms in the coating layer 102 is not limited to the method using TEM-EELS as described above. For example, X-ray Photoelectron Spectroscopy or Raman spectroscopy may also be used.

Other Additives

The positive electrode layer 10 may further include an additive such as a conductive agent, a binder, a filler, a dispersing agent, and an ion-conductive agent, in addition to the positive electrode particle 100 (comprising the positive active material 101 and the coating layer 102) and the solid electrolyte 301.

Examples of the conductive agent that may be included in the positive electrode layer 10 may include graphite, carbon black, acetylene black, ketjen black, carbon fiber, metal powder, or combination thereof. In addition, examples of the binder that may be included in the positive electrode layer 10 may include polytetrafluoroethylene, polyvinylidene fluoride, and polyethylene. In addition, the filler, the dispersing agent, and the ion-conductive agent that may be included in the positive electrode layer 10 may be any suitable filler, dispersing agent, and ion-conductive agent used in electrodes of lithium-ion secondary batteries.

Negative Electrode Layer 20

The negative electrode layer 20 will be further described.

The negative electrode layer 20 includes a negative active material 201 and the solid electrolyte 301 as illustrated in FIG. 1A.

The solid electrolyte layer 30 comprises the solid electrolyte 301, which may be in the form of particles. The structure of the solid electrolyte 301 will be further described below.

Negative Active Material 201

The negative active material 201 comprises a material having a lower charge-discharge potential than that of the positive active material 101, that is alloyable with lithium and provides for reversible intercalation and deintercalation, and/or reversible alloying and dealloying, of lithium ions.

The negative active material 201 may comprise any suitable material used in the art as a negative active material of lithium secondary batteries. The negative active material 201 may comprise lithium metal, a metal alloyable with lithium, a transition metal oxide, a non-transition metal oxide, a material that allows doping or undoping of lithium, a carbonaceous material, or a combination thereof.

The metal alloyable with lithium may include Si, Sn, Al, In, Ge, Pb, Bi, Sb, a Si-M" alloy (wherein M" is an alkali metal, an alkaline earth metal, a Group 8 element, a Group 14 element, a transition metal, a rare earth element, or any combination thereof (except for Si)), a Sn-M'" alloy (wherein M'" is an alkali metal, an alkaline earth metal, a Group 8 element, a Group 14 element, a transition metal, a rare earth element, or any combination thereof (except for Sn)), and the like. In this regard, M''' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or any combination thereof.

Examples of the transition metal oxide include tungsten oxide, molybdenum oxide, titanium oxide, lithium titanium oxide, vanadium oxide, and lithium vanadium oxide.

The non-transition metal oxide may be, for example, $SnO_2$, $SiO_x$ (0<x<2), and the like.

The material that allows doping and undoping of lithium ions may be, for example, Sn, $SnO_2$, and Sn-M'' alloy (where M'' is an alkali metal, an alkaline earth metal, a Group 11 element, a Group 12 element, a Group 13 element, a Group 14 element, a Group 15 element, a Group 16 element, a transition metal, a rare earth element, or any combination thereof (except for Sn)). In this regard, M'' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or any combination thereof.

The carbonaceous material may include crystalline carbon, amorphous carbon, or any mixture thereof. Examples of the carbonaceous material may include natural graphite, artificial graphite, graphite carbon fiber, resin-sintered carbon, carbon grown by vapor-phase thermal decomposition, coke, mesophase carbon microbeads ("MCMB"s), furfuryl alcohol resin-sintered carbon, polyacene, pitch-based carbon fibers ("PCF"'), vapor grown carbon fiber, soft carbon (low temperature sintered carbon) or hard carbon, and mesophase pitch carbide. The negative active material 201 may be used alone in a combination of at least two thereof.

The carbonaceous material may be in non-shaped, plate, flake, spherical or fibrous form, or any combination thereof.
Other Additives The negative electrode layer 20 may further include an additive such as a conductive agent, a binder, a filler, a dispersing agent, and an ion-conductive agent, in addition to the negative active material 201 and the solid electrolyte 301.

The additive included in the negative electrode layer 20 may be the same as those added to the positive electrode layer 10.
Solid Electrolyte Layer 30

The solid electrolyte layer 30 is disposed between the positive electrode layer 10 and the negative electrode layer 20, as illustrated in FIG. 1A, and includes the solid electrolyte 301, which comprises a sulfide-based solid electrolyte material.
Solid Electrolyte 301

The solid electrolyte 301 comprises a sulfide-based solid electrolyte. The sulfide-based solid electrolyte material includes at least sulfur and lithium and may further include phosphorus (P), silicon (Si), boron (B), aluminum (Al), germanium (Ge), zinc (Zn), gallium (Ga), indium (In), a halogen element, or combination thereof.

Particularly, the solid electrolyte 301 includes lithium sulfide as the sulfide-based solid electrolyte material and includes silicon sulfide, phosphorus sulfide, boron sulfide, or a combination thereof, as a second component. For example, the sulfide-based solid electrolyte material may include $Li_2S$—$P_2S_5$.

The sulfide-based solid electrolyte material may further include a sulfide such as $SiS_2$, $GeS_2$, and $B_2S_3$ in addition to the $Li_2S$—$P_2S_5$, which has a greater lithium-ion conductivity than other inorganic compounds. In addition, the sulfide-based solid electrolyte may be an inorganic solid electrolytes prepared by adding $Li_3PO_4$, a halogen compound, $Li_{2+2x}Zn_{1-x}GeO_4$ wherein 0<x<1 ("LISICON"), $Li_{3+y}PO_{4-x}N_x$ ("LIPON"), $Li_{3.25}Ge_{0.25}P_{0.75}S_4$ ("Thio-LISICON"), and $Li_2O$—$Al_2O_3$—$TiO_2$—$P_2O_5$ ("LATP") to an inorganic solid electrolytes prepared by combining $Li_2S$—$P_2S_5$, $SiS_2$, $GeS_2$, $B_2S_3$, and the like.

Examples of the sulfide-based solid electrolyte material may include $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mSn$ (where m and n are positive integers and Z is Ge, Zn, or Ga), $Li_2S$—$GeS_2$, $Li_2S$—$SiS_2$—$Li_3PO_4$, and $Li_2S$—$SiS_2$—$Li_pMO_q$ (where p and q are positive integers and M is P, Si, Ge, B, Al, Ga, or In).

Among these compounds, the sulfide-based solid electrolyte material constituting the solid electrolyte 301 may include at least sulfur, phosphorus, and lithium. For example, a material including $Li_2S$—$P_2S_5$ may be used.

When a material including $Li_2S$ and $P_2S_5$ is used as the sulfide-based solid electrolyte material constituting the solid electrolyte 301, a mixing ratio of $Li_2S$ to $P_2S_5$ ($Li_2S$:$P_2S_5$) may be, for example, about 50:50 to about 90:10 in a molar ratio.

The solid electrolyte 301 may have a particulate shape such as a spherical shape and an oval spherical shape. In addition, although a particle diameter of the solid electrolyte 301 is not particularly limited, an average particle diameter thereof may be in the range of about 0.01 μm to about 1 μm, for example, in the range of about 0.1 μm to about 0.5 μm.

However, in an all-solid-state lithium-ion secondary batteries including a solid electrolyte layer, which includes a solid electrolyte having a particulate shape as an electrolyte layer, because a positive active material and an electrolyte are solids in all-solid-state secondary batteries including a solid electrolyte, penetration of the electrolyte into the interior of the positive active material is more difficult than that of an organic electrolyte. Thus, an area of the interface between the positive active material and the electrolyte decreases, and accordingly, it is difficult to sufficiently obtain a pathway of lithium ions and electrons between the positive active material and the electrolyte.

However, since the positive electrode layer 10 is prepared by mixing the solid electrolyte 301 having a particulate shape and the positive electrode particle 100, the area of the interface between the positive electrode particle 100 and the solid electrolyte 301 is increased, so that a sufficient pathway of lithium ions and electrons may be obtained between the positive electrode particle 100 and the solid electrolyte 301.

In addition, when a sulfide-based solid electrolyte is used as a solid electrolyte, a reaction may occur between the positive active material and the solid electrolyte while charging a lithium-ion secondary battery, thereby generating a resistive component. The generation of the resistive component may increase resistance (e.g., interface resistance) against movement of lithium ions through the interface between the positive active material and the solid electrolyte increases.

However, since the positive electrode layer 10 includes the coating layer 102 formed of an amorphous carbonaceous layer not including lithium ions on the surface of the positive active material 101, the coating layer 102 may prevent direct contact between the positive active material 101 and the solid electrolyte 301. Thus, a reaction may be prevented in the interface between the positive active material 101 and the solid electrolyte 301, and generation of the resistive component may be inhibited in the interface between the positive active material 101 and the solid electrolyte 301. In addition, although charging and discharging of the lithium-ion secondary battery 1 are repeated, a sufficient pathway of the lithium ions is formed between the positive active material 101 and the solid electrolyte 301, thereby inhibiting reduction in the output of the lithium-ion secondary battery 1. Thus, discharge capacity, load characteristics, and cycle characteristics of the lithium-ion secondary battery 1 may be improved.

In addition, since the amorphous carbonaceous layer, such as DLC, is used as the coating layer 102, the thermal stability and chemical stability of the coating layer 102 may be improved when compared to using another material as the coating layer 102, thereby inhibiting deterioration of the coating layer 102. Accordingly, a reaction in the interface between the positive active material 101 and the solid electrolyte 301 may be inhibited for a long time, and lithium-ion conductivity between the positive active material 101 and solid electrolyte 301 may be maintained at a high level. As a result, load characteristics and cycle characteristics of the lithium-ion secondary battery 1 may be improved.

Method of Preparing the Lithium-Ion Secondary Battery

Hereinafter, a method of preparing a lithium-ion secondary battery 1, according to an embodiment, will be further described. The lithium-ion secondary battery 1 is prepared by respectively preparing a positive electrode layer 10, a negative electrode layer 20, and a solid electrolyte layer 30, and stacking the layers.

Hereinafter, processes of the preparation of the lithium-ion secondary battery 1 will be sequentially described.

Preparation of Positive Electrode Layer 10

First, a positive electrode particle 100 is prepared to prepare a positive electrode layer 10. The positive electrode particle 100 may be prepared by forming a coating layer 102 on a surface of the positive active material 101.

Formation of Positive Active Material 101

The positive active material 101 may be prepared using a known method, the details of which may be determined by one of skill in the art without undue experimentation.

For example, when NCA is used as the positive active material 101, the positive active material 101 may be prepared as follows:

First, $Ni(OH)_2$ powder, $Co(OH)_2$ powder, $Al_2O_3 \cdot H_2O$ powder, and $LiOH \cdot H_2O$ powder are mixed in the same composition ratio as in the NCA to be generated and the mixture is ground using a ball mill. Continuously, the ground raw material mixture powder is mixed with a dispersing agent, a binder, and the like. A viscosity of the mixture is adjusted and the mixture is molded in the form of a sheet. Then, the molded sheet-shaped product is sintered at a predetermined temperature, and the sintered product is pulverized by using a sieve (mesh) to obtain the positive active material 101 having a particulate shape. In this regard, the particle diameter of the positive active material 101 may be adjusted by changing the sieve (mesh) used in the pulverization of the molded product.

Formation of Coating Layer 102

The coating layer 102 may be formed by, for example, chemical vapor deposition ("CVD") such as plasma-enhanced chemical vapor deposition ("PECVD"), ion plating, and sputtering, and physical vapor deposition ("PVD"). The CVD includes thermal CVD and PECVD and the PVD includes resistance heating deposition, e-beam evaporation, pulsed laser deposition ("PLD"). Among these methods, PECVD or PLD may be used.

When the coating layer 102 is formed by PECVD, the positive active material 101, on which the coating layer 102 will be formed, is added to a vacuum reactor, and a reaction gas and a carrier gas are introduced into the vacuum reactor. Then, plasma is created in the vacuum reactor by discharge of the reaction gas, and the reaction gas ionized by the plasma is attached to the surface of the positive active material 101, thereby forming the coating layer 102 including an amorphous carbonaceous layer.

A hydrocarbon gas may be used as the reaction gas. According to an embodiment, the hydrocarbon gas may comprise, for example, acetylene, methane, benzene, toluene, xylene, naphthalene, cyclohexane, or a combination thereof to provide a deposition product thereof. Also, an alicyclic hydrocarbon-containing gas represented by the formula $C_{4n+6}H_{4n+12}$ (where n is a positive integer, e.g., 1 to 20) such as adamantine or diamantane, may be used as the reaction gas.

The reaction gas may be selected such that the amorphous carbonaceous layer constituting the coating layer 102 has a desired composition ratio. That is, the amount of hydrogen atoms or the ratio of the $sp^2$ hybridized carbon atoms to the $sp^3$ hybridized carbon atoms in the amorphous carbonaceous layer constituting the coating layer 102 may be adjusted by changing types or flow rates of the hydrocarbon gas used as the reaction gas.

The hydrocarbon gas used as the reaction gas may be used alone or in a combination thereof.

Here, acetylene has sp hybridized carbon atoms. For example, when acetylene is used as the reaction gas, sp hybridized carbon atoms contained in acetylene are decomposed or involved in a reaction by discharge, resulting in generation of $sp^2$ hybridized carbon atoms or $sp^3$ hybridized carbon atoms. Accordingly, the coating layer 102 formed of the amorphous carbonaceous layer including $sp^2$ hybridized carbon atoms and $sp^3$ hybridized carbon atoms may be obtained.

In addition, the carrier gas may be hydrogen gas or argon gas. Types or flow rates of the carrier gas may be controlled such that the amorphous carbonaceous layer constituting the coating layer 102 has a desired composition ratio. For example, when hydrogen gas is used as the carrier gas, the amount of hydrogen atom in the coating layer 102 may be adjusted by changing a flow rate of hydrogen gas with respect to raw-material gases.

The formation of the coating layer 102 may be performed at a pressure of about 0.01 pascals (Pa) to about 1 Pa.

In addition, the formation of the coating layer 102 may be performed at a temperature of about 100° C. to about 500° C. As the temperature increases, the coating layer 102 may have defects. On the other hand, as the temperature decreases, discharge may not be stably performed in the reactor.

In addition, when the coating layer 102 is formed by PECVD, the surface of the positive active material 101 may be cleaned and activated by applying an ion bombardment treatment to the positive active material 101 before forming the coating layer 102.

As described above, the coating layer 102 comprising the amorphous carbonaceous layer may be formed by using various PVD methods.

When the coating layer 102 is formed by PVD, solid materials such as graphite, glassy-carbon, and DLC may be used as a carbon source. When a solid material not including hydrogen atom is used as the carbon source in the PVD and hydrogen atoms are added to the coating layer 102, a hydrogen gas-containing gas may be supplied.

Accordingly, the positive electrode particle 100, including the coating layer 102 formed as an amorphous carbonaceous layer not including lithium ions on the surface of the positive active material 101, may be prepared.

Then, the prepared positive electrode particle 100 is mixed with a solid electrolyte 301 prepared according to a method to be further described later and various additives and added to a solvent such as water or an organic solvent to prepare a slurry or paste. The slurry or paste is coated on a current collector and dried, and then the structure is pressure-welded using a rolling roll and the like, thereby preparing the positive electrode layer 10.

Preparation of Negative Electrode Layer 20

A negative electrode layer 20 may be prepared using a known method, the details of which may be determined by one of skill in the art without undue experimentation.

For example, the negative electrode layer 20 may be prepared by mixing a negative active material 201 with a solid electrolyte 301 prepared according to a method to be described later and various additives, adding the mixture to a solvent such as water or an organic solvent to prepare a slurry or paste, coating the obtained slurry or paste on a current collector, drying the coating, and pressure-welding the dried coating.

In this regard, the current collector may be a plate or foil that is formed of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof.

Alternatively, the negative electrode layer 20 may be prepared by consolidating a mixture of the negative active material 201 and various additives into pellets without using a current collector. Alternatively, when a metal or a metal alloy is used as the negative active material 201, a metal sheet or a metal foil may be used as the negative electrode layer 20.

Preparation of Solid Electrolyte Layer 30

The solid electrolyte layer 30 may be prepared using, for example, the following method.

In the preparation of the solid electrolyte layer 30, first, a solid electrolyte 301 constituting the solid electrolyte layer 30 is prepared. Preparation of the solid electrolyte 301 comprising the sulfide-based solid electrolyte material may be performed by, for example, a melt quenching method or a mechanical milling ("MM") method. Hereinafter, a method of preparing the solid electrolyte layer 30 using a sulfide-based solid electrolyte material including $Li_2S$ and $P_2S_5$ as the solid electrolyte 301 will be further described.

According to the melt quenching method, first, $Li_2S$ and $P_2S_5$ are mixed in a predetermined ratio and the mixture is compressed into pellets. The pellets are reacted at a reaction temperature in a vacuum and quenched to prepare a sulfide-based solid electrolyte.

In this regard, a reaction temperature may be in the range of about 400° C. to about 1000° C., for example, in the range of about 800° C. to about 900° C. In addition, a reaction time may be in the range of about 0.1 hour to about 12 hours, for example, about 1 hour to about 12 hours. Furthermore, a temperature during the quenching of the reactants may be equal to or less than about 10° C., for example, equal to or less than about 0° C., and a quenching rate may be in the range of about 1 Kelvin per second (K/sec) to about 10000 K/sec, for example, about 1 K/sec to about 1000 K/sec.

According to the MM method, $Li_2S$ and $P_2S_5$ are mixed in a predetermined ratio and subjected to a reaction while strongly stirring using an attritor or a ball mill for a predetermined time period, thereby preparing a sulfide-based solid electrolyte.

According to the MM method, the reaction of raw materials may be performed at room temperature. Since the sulfide-based solid electrolyte is prepared at room temperature according to the MM method, the raw materials cannot be thermally decomposed and the sulfide-based solid electrolyte may have a desired composition ratio.

Here, the rotation speed and rotation time during the MM method are not particularly limited. However, as the rotation speed increases, a generation rate of the solid electrolyte increases, and as the rotation time increases, a conversion rate of the raw materials into the solid electrolyte increases.

Then, the sulfide-based solid electrolyte prepared by the melt quenching method or the MM method is heat-treated at a predetermined temperature and ground to prepare the solid electrolyte 301 having a particulate shape.

The obtained solid electrolyte 301 having a particulate shape is used to form the solid electrolyte layer 30 by a method for layer formation such as blasting, aerosol deposition, cold spraying, sputtering, CVD, or spraying.

The solid electrolyte layer 30 may also be prepared by mixing the solid electrolyte 301 with a solvent, a binder such as a binding material or a polymer compound, or a support that is a material or compound used to reinforce the strength of the solid electrolyte layer 30 or to prevent a short circuit of the solid electrolyte 301, and pressing the mixture.

Preparation of Lithium-Ion Secondary Battery

A lithium-ion secondary battery 1 may be prepared by sequentially stacking the positive electrode layer 10, the solid electrolyte layer 30, and the negative electrode layer 20 prepared as described above and pressing the structure.

A plurality of the prepared lithium-ion secondary batteries may be stacked to form a battery pack, and the battery pack may be applied to an electrical device to provide high capacity and high power output. For example, the lithium-ion secondary battery may be suitable for use as a power source for an electric vehicles to provide high capacity, high power output, and high temperature driving conditions for operations, in addition to a power source for a mobile phone or a portable computer, and may also be coupled to an internal combustion engine, a fuel cell, or a super-capacitor to be used in a hybrid vehicles.

The present disclosure will be described in more detail, according to the following examples and comparative examples. However, the following examples are merely presented to exemplify the present disclosure, and the scope of the present disclosure shall not be limited thereto.

EXAMPLES

Test cells of the lithium-ion secondary battery were prepare and evaluated as follows.

Example 1

First, a positive electrode particle 100 was prepared by forming a coating layer 102 using DLC on a surface of a positive active material 101 formed of $LiNi_{0.8}Co_{0.15}Al_{0.05}O_2$ (NCA, manufactured by Nippon Chemical Industrial Co., Ltd. by PECVD.

Particularly, the coating layer 102 was formed by performing an ion bombardment treatment for 3 minutes, and supplying Ar gas, as a carrier gas, at a rate of 10 standard cubic centimeters per minute ("sccm") and acetylene gas, as a reaction gas, at a rate of 150 sccm by using a PECVD device while heating at a temperature of 200° C. at a pressure of 0.06 Pa.

In addition, a ratio of the $sp^2$ hybridized carbon atoms to $sp^3$ hybridized carbon atoms contained in the coating layer 102 formed on the surface of the positive active material 101, measured according to the method described above, (a ratio of $sp^2$:$sp^3$) was 52:48. In addition, the coating layer 102 had a thickness of about 5 nm to about 10 nm.

Then, $Li_2S$ and $P_2S_5$ were mixed in a molar ratio of 80:20 and the mixture was subjected to a mechanical milling ("MM") process to obtain a solid electrolyte ("SE") 301.

Then, a negative electrode layer 20 was prepared by mixing graphite, as a negative active material 201, the SE 301, and vapor grown carbon fiber ("VGCF"), as a conductive agent in a mass ratio of 60/35/5, stacking 80 milligrams (mg) of the mixture in a cell container, and trimming the surface thereof by using a molding device.

Then, a solid electrolyte layer 30 was prepared by stacking 100 mg of the SE 301 on the negative electrode layer 20 in the cell container and trimming the surface thereof by using the molding device.

Then, a positive electrode layer 10 was prepared by mixing the positive electrode particle 100 including the positive active material 101 and the coating layer 102 formed on the surface of the positive active material 101 using DLC, the SE 301, and VGCF, as a conductive agent, in a mass ratio of 60/35/5, and stacking 80 mg of the mixture on the solid electrolyte layer 30 in the cell container.

Then, a pressure of 3 tons per square centimeter ($t/cm^2$) was applied to the stack structure of the negative electrode layer 20, the solid electrolyte layer 30, and the positive electrode layer 10 contained in the cell container to prepare pellets, thereby obtaining a test cell.

Example 2

First, a positive electrode particle 100 was prepared by forming a coating layer 102 using DLC on a surface of a positive active material 101 formed of NCA (manufactured by Nippon Chemical Industrial Co., Ltd.) by PVD.

Particularly, the coating layer 102 was formed by using graphite as a carbon ion deposition source at a pressure of equal to or less than 10~4 Pa.

As a result of measuring a ratio of the $sp^2$ hybridized carbon atoms to $sp^3$ hybridized carbon atoms contained in the coating layer 102 formed on the surface of the positive active material 101, the ratio of $sp^2$:$sp^3$ was 40:60. In addition, the coating layer 102 had a thickness of about 5 nm to about 10 nm.

Then, $Li_2S$ and $P_2S_5$ were mixed in a molar ratio of 80:20 and the mixture was subjected to a mechanical milling ("MM") process in the same manner as in Example 1 to obtain an SE 301.

Then, a negative electrode layer 20 was prepared by mixing graphite, as a negative active material 201, the SE 301, and VGCF, as a conductive agent, in a mass ratio of 60/35/5, stacking 80 mg of the mixture in a cell container, and trimming the surface thereof by using a molding device.

Then, a solid electrolyte layer 30 was prepared by stacking 100 mg of the SE 301 on the negative electrode layer 20 in the cell container and trimming the surface thereof by using the molding device.

Then, a positive electrode layer 10 was prepared by mixing the positive electrode particle 100 including the positive active material 101 and the coating layer 102 formed on the surface of the positive active material 101 using DLC, the SE 301, and VGCF, as a conductive agent, in a mass ratio of 60/35/5, and stacking 80 mg of the mixture on the solid electrolyte layer 30 in the cell container.

Then, a pressure of 3 $t/cm^2$ was applied to the stack structure of the negative electrode layer 20, the solid electrolyte layer 30, and the positive electrode layer 10 contained in the cell container to prepare pellets, thereby obtaining a test cell.

Comparative Example

A test cell was prepared by stacking the negative electrode layer 20, the solid electrolyte layer 30, and the positive electrode layer 10 in a cell container and applying a pressure of 3 $t/cm^2$ to the stack structure to prepare pellets in the same manner as Example 1, except that the coating layer 102 was not formed on the surface of the positive active material 101.

Evaluation

The test cells respectively prepared according to Example 1, Example 2, and Comparative Example were charged at a rate of 0.05 C at 25° C. until the voltage reached an upper limit of 4.0 volts (V) and initial discharge capacity thereof was measured. Then, the test cells were discharged at a rate of 0.05 C until the voltage reached a cut-off voltage of discharge of 2.5 V. Then, charge and discharge were performed with constant currents of 0.5 C and 1 C. In addition, AC impedance was measured respectively at 4.0 V, 4.1 V and 4.2 V. The battery performance of each of the test cells prepared according to Example 1, Example 2, and Comparative Example was evaluated.

Evaluation results of the test cells according to Example 1, Example 2, and Comparative Example are shown in Table 2 below.

TABLE 2

| | $sp^2$:$sp^3$ | Initial discharge capacity (mAh/g) | Impedance (Ω) | Rate property (1 C/0.05 C) |
|---|---|---|---|---|
| Example 1 | 52:48 | 114 | 129 | 0.63 |
| Example 2 | 60:40 | 103 | 222 | 0.62 |
| Comparative Example | — | 102 | 438 | 0.33 |

Figure 3:
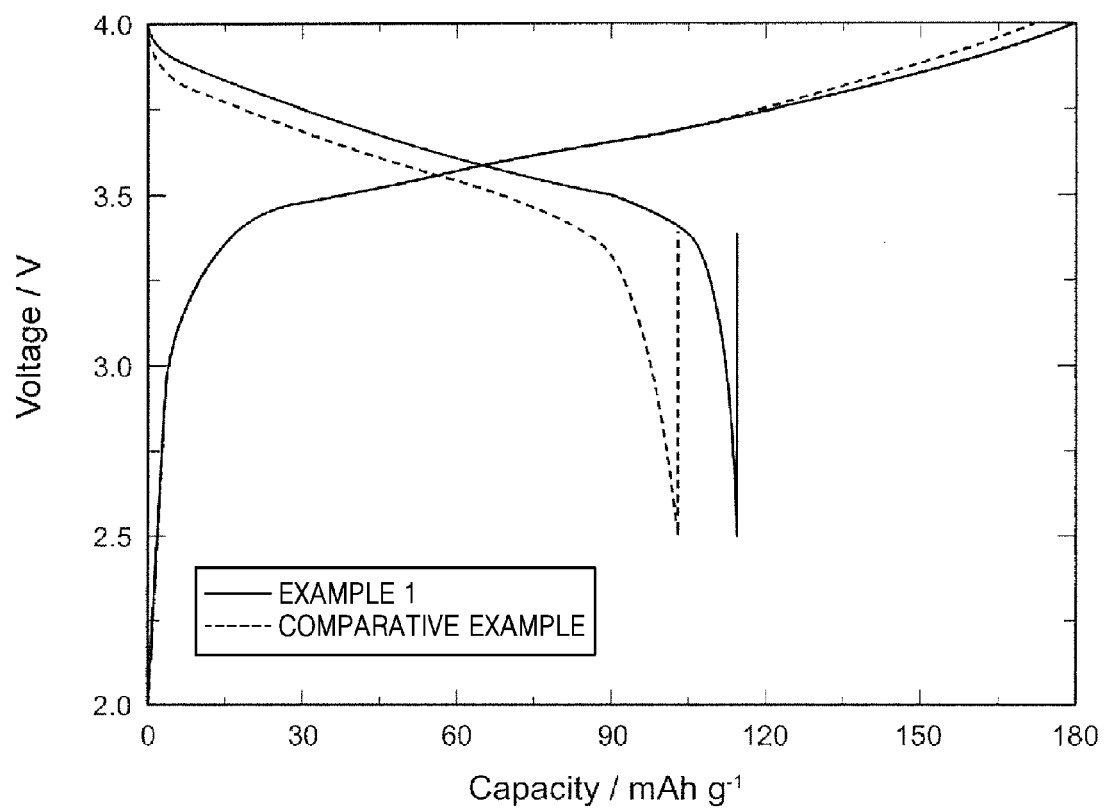
FIG. 3 is a graph of voltage (volts, V) versus capacity (milliampere-hours per gram, $mAh \cdot g^{-1}$) showing initial charge and discharge curves of test cells according to Example 1 and Comparative Example.
Figure 4A:
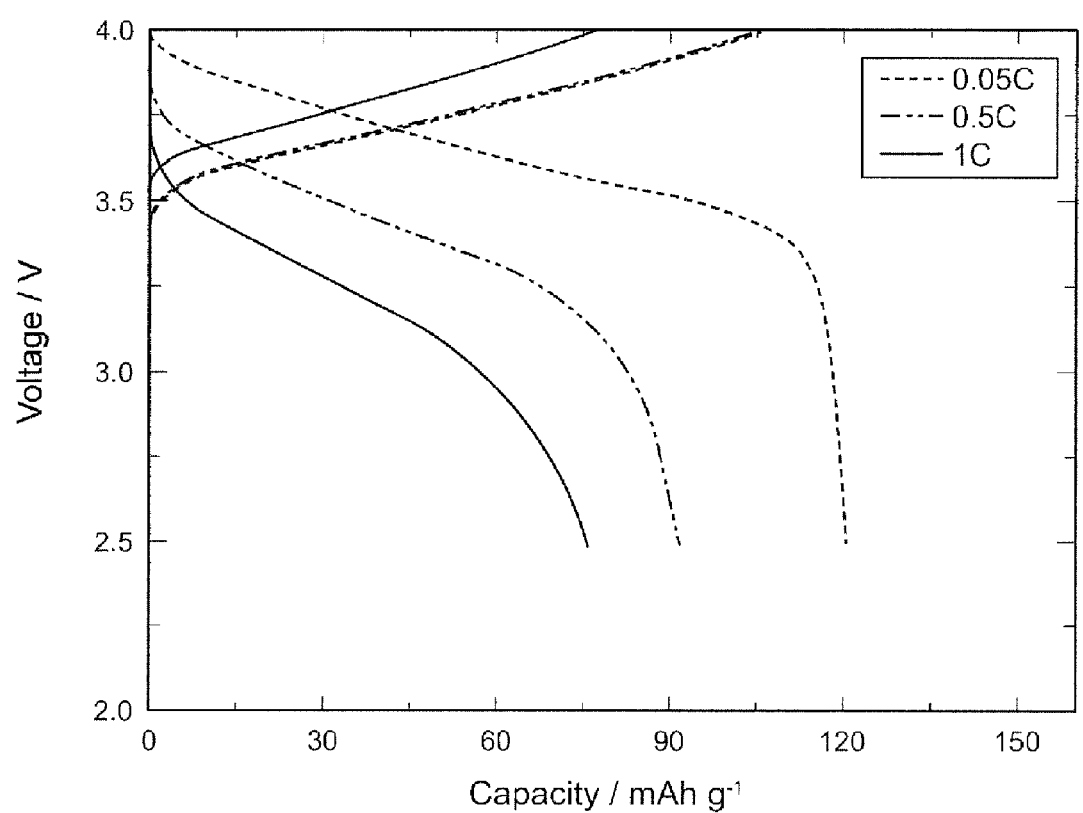
FIGS. 4A and 4B are each graphs of voltage (volts, V) versus capacity (milliampere-hours per gram, $mAh \cdot g^{-1}$) showing rate characteristics of test cells according to Example 1 and the Comparative Example, respectively.
Figure 4B:
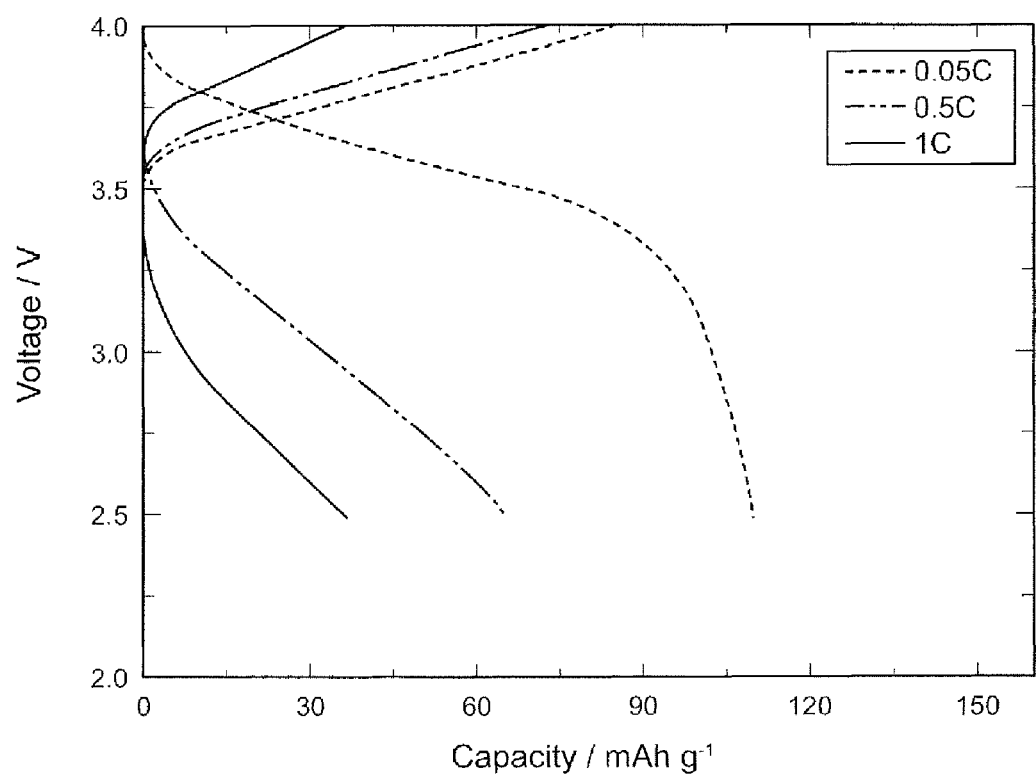

In addition, FIG. 3 is a graph of initial charge and discharge curves of the test cells according to Example 1 and Comparative Example. FIGS. 4A and 4B are graphs of rate properties of the test cells according to Example 1 and Comparative Example. As the rate property, FIGS. 4A and 4B illustrate charge and discharge curves when the test cells are charged and discharged at constant currents of 0.05 C, 0.5 C, and 1 C. FIG. 4A illustrates rate property of the test cell according to Example 1, and FIG. 4B illustrates rate property of the test cell according to Comparative Example. In addition, in FIGS. 3, 4A, and 4B, the x-axes indicate charge and discharge capacity, and the y-axes indicate voltage.

Figure 5:
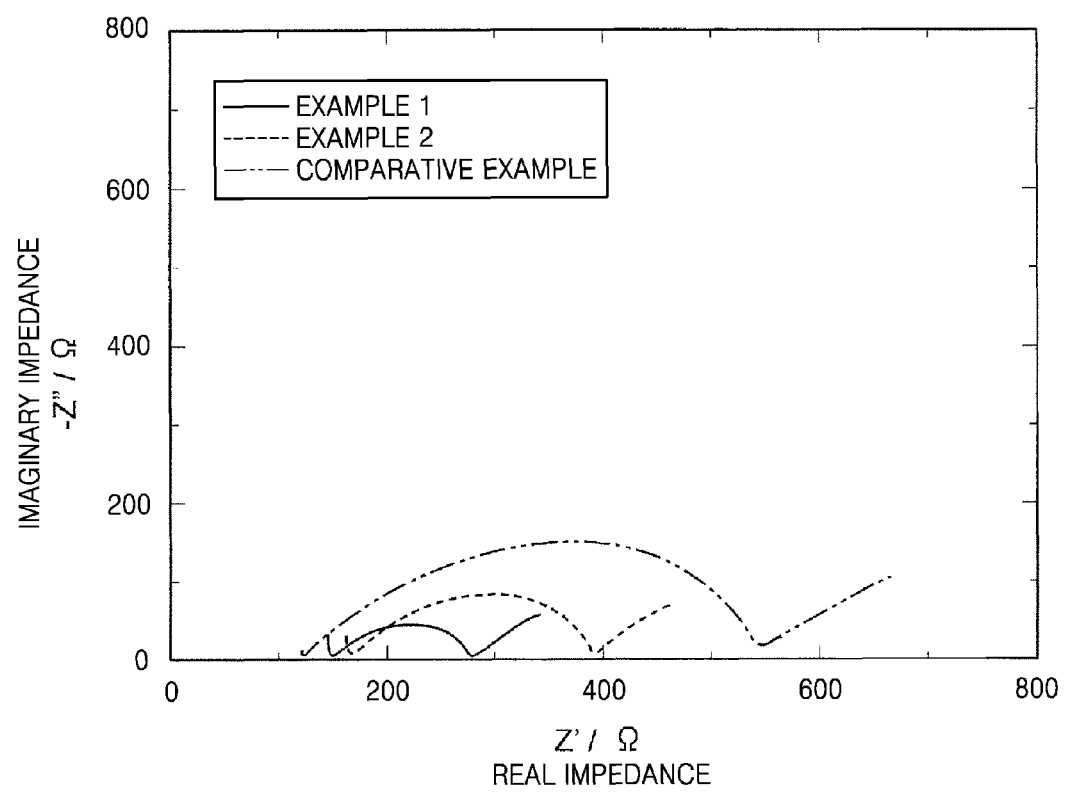
FIG. 5 is a graph of imaginary resistance (-Z", ohms) versus real resistance (Z', ohms) showing the results of impedance analysis of test cells according to Example 1, Example 2, and Comparative Example at 4.0 V.
Figure 6A:
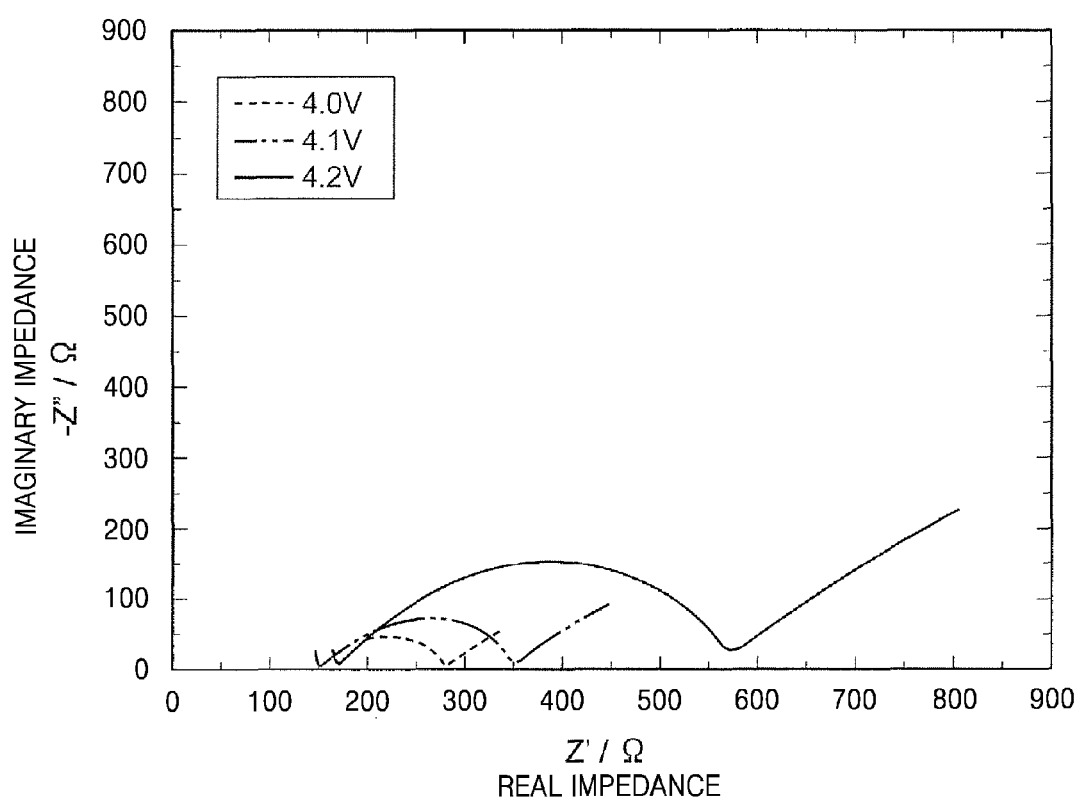
FIGS. 6A and 6B are each graphs of imaginary resistance (-Z", ohms) versus real resistance (Z', ohms) showing the results of impedance analysis of test cells according to Example 1 and Example 2, respectively, at 4.0 V, 4.1 V, and 4.2 V.
Figure 6B:
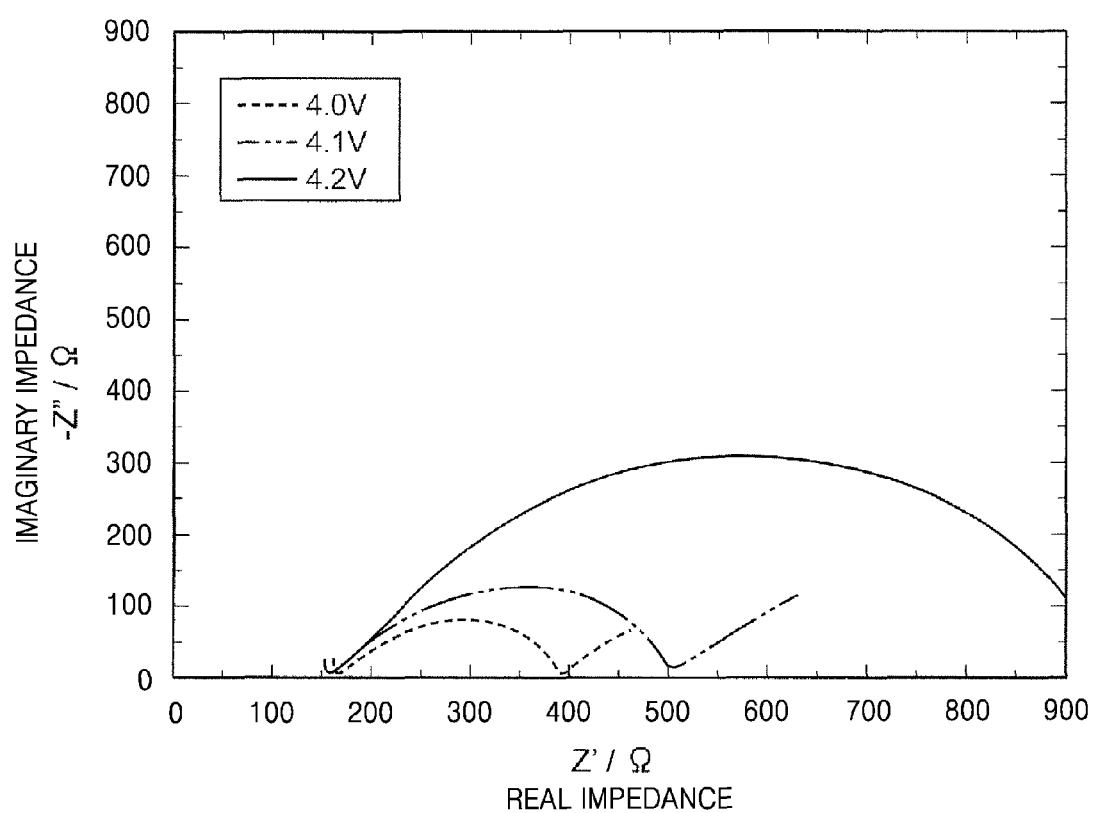
Figure 7:
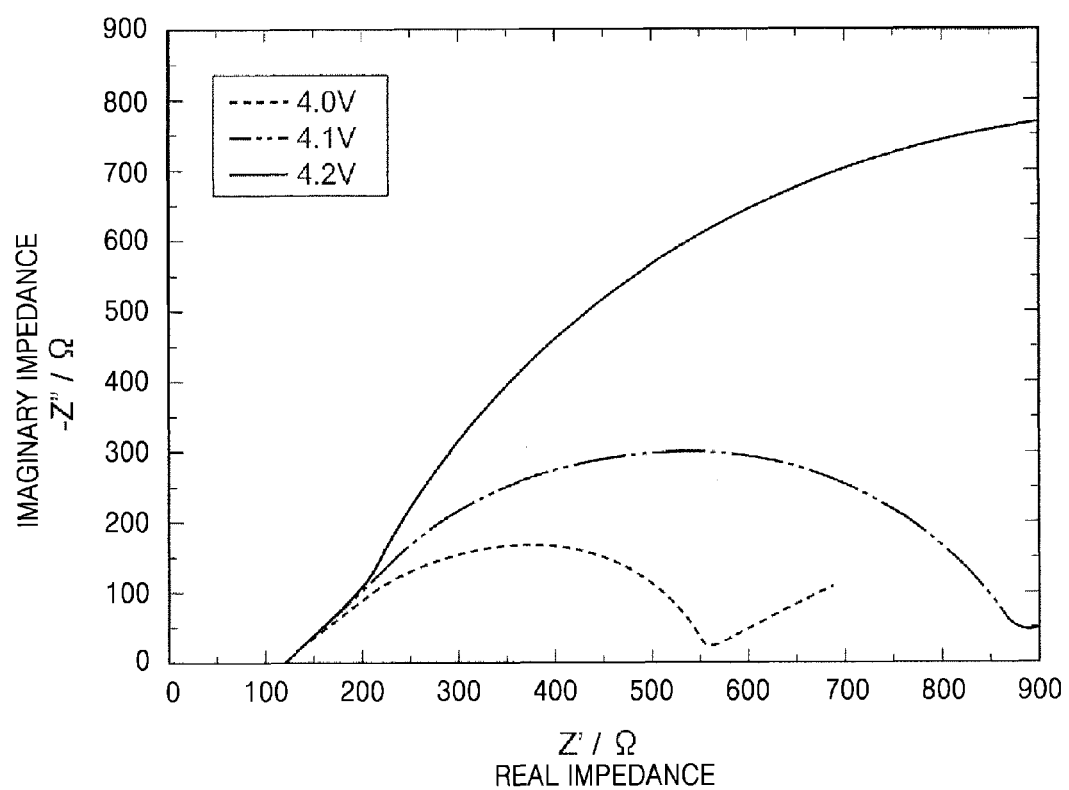
FIG. 7 is a graph of imaginary resistance (−Z″, ohms) versus real resistance (Z′, ohms) showing the results of impedance analysis of a test cell according to Comparative Example at 4.0 V, 4.1 V, and 4.2 V.

FIG. 5 is a graph of impedance of the test cells according to Example 1, Example 2, and Comparative Example at 4.0 V. FIGS. 6A and 6B are graphs of impedance of the test cells according to Example 1 and Example 2 at 4.0 V, 4.1 V, and 4.2 V. The results of Example 1 are shown in FIG. 6A and the results of Example 2 are shown in FIG. 6B. FIG. 7 is a graph of impedance of the test cell according to Comparative Example at 4.0 V, 4.1 V, and 4.2 V. In FIGS. 5, 6A, 6B, and 7, the x-axes indicate a real part of a complex impedance, and the y-axes indicate an imaginary part of the complex impedance.

Referring to Table 2 and FIG. 3, it was confirmed that the test cells in which the coating layer 102 including DLC is formed on the surface of the positive active material 101 according to Examples 1 and 2 exhibited greater initial discharge capacity than the test cell in which the coating layer 102 is not formed on the surface of the positive active material 101 according to Comparative Example.

In addition, as shown in Table 2 and FIG. 4, the test cells in which the coating layer 102 including DLC is formed on the surface of the positive active material 101 according to Examples 1 and 2 exhibited excellent rate characteristics compared to the test cell in which the coating layer 102 is not formed on the surface of the positive active material 101 according to Comparative Example. Particularly, it was confirmed that a discharge capacity during discharging at a rate of 1 C was maintained at 60% or greater than a discharge capacity during discharging at a rate of 0.05 C in the test cells according to Examples 1 and 2. On the contrary, it was confirmed that discharge capacity during discharging at a rate of 1 C was maintained at 33% of discharge capacity during discharging at a rate of 0.05 C in the test cell according to Comparative Example, which was lower than those according to Examples 1 and 2. That is, it was confirmed that capacity is less reduced as current density increases by forming the coating layer 102 on the surface of the positive active material 101 by using DLC, when compared to the case of not forming the coating layer 102.

In addition, as shown in Table 2 and FIG. 5, the test cells according to Examples 1 and 2 in which the coating layer 102 is formed on the surface of the positive active material 101 by using DLC had a lower impedance than the test cell according to Comparative Example in which the coating layer 102 is not formed on the surface of the positive active material 101. Furthermore, as illustrated in FIGS. 6A, 6B, and 7, according to Examples 1 and 2, impedance is not increased at a higher potential when compared to Comparative Example.

In addition, although detailed descriptions are not be given herein, the deterioration of the test cells according to Examples 1 and 2 may be inhibited after repeating charge and discharge, compared to the test cell according to Comparative Example.

Furthermore, upon comparison between Example 1 and Example 2, the test cell according to Example 1 in which the coating layer 102 is formed by PECVD and the ratio of the $sp^2$ hybridized carbon atoms to the $sp^3$ hybridized carbon atoms ($sp^2$:$sp^3$) is 52:48 has greater discharge capacity, lower impedance, and better rate characteristics than the test cell according to Example 2 in which the coating layer 102 is formed by PVD and the ratio of the $sp^2$ hybridized carbon atoms to the $sp^3$ hybridized carbon atoms ($sp^2$:$sp^3$) is 60:40.

As described above, reactions in the interface between the positive active material 100 and the solid electrolyte 301 may be inhibited by forming the coating layer 102 on the surface of the positive active material 101 by using an amorphous carbonaceous layer not including lithium ions. As a result, discharge capacity, load characteristics, and cycle characteristics of the lithium-ion secondary battery 1 may be improved.

As described above, according to the one or more of the above embodiments, in the positive electrode of a lithium-ion secondary battery including the sulfide-based solid electrolyte, a reaction may be inhibited in the interface between the positive active material and the sulfide-based solid electrolyte.

It should be understood that the exemplary embodiments described therein should be considered in a descriptive sense only and not for purposes of limitation. Descriptions of features, advantages, or aspects within each embodiment shall be considered as available for other similar features, advantages, or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. A positive electrode for a lithium-ion secondary battery, the positive electrode comprising:
    a positive electrode particle comprising
        a positive active material comprising a lithium salt, and
        a coating layer comprising an amorphous carbonaceous layer on a surface of the positive active material; and
    a sulfide solid electrolyte contacting the coating layer, wherein the sulfide solid electrolyte comprises a solid sulfide,
    wherein the coating layer comprises a diamond-like carbon,
    wherein the coating layer comprises hydrogen atoms, and
    wherein an amount of the hydrogen atoms is in the range of about 1 atomic percent to about 50 atomic percent, based on a total content of the coating layer.

2. The positive electrode for a lithium-ion secondary battery of claim 1, wherein the coating layer comprises an aliphatic hydrocarbon, an aromatic hydrocarbon, or a combination thereof.

3. The positive electrode for a lithium-ion secondary battery of claim 1, wherein the coating layer comprises a deposition product of acetylene, methane, benzene, toluene, xylene, naphthalene, cyclohexane, or a combination thereof.

4. The positive electrode for a lithium-ion secondary battery of claim 1, wherein the coating layer comprises a deposition product of an alicyclic hydrocarbon of the formula $C_{4n+6}H_{4n+12}$, where n is a positive integer.

5. The positive electrode for a lithium-ion secondary battery of claim 1,
    wherein the coating layer comprises $sp^2$ hybridized carbon atoms and $sp^3$ hybridized carbon atoms, and
    wherein a content of the $sp^3$ hybridized carbon atoms in the coating layer is in the range of about 10% to about 100%, based on a total carbon content of the coating layer.

6. The positive electrode for a lithium-ion secondary battery of claim 1, wherein the coating layer is formed by plasma-enhanced chemical vapor deposition or physical vapor deposition.

7. The positive electrode for a lithium-ion secondary battery of claim 1, wherein the sulfide solid electrolyte is in a form of particles.

8. The positive electrode for a lithium-ion secondary battery of claim 1, wherein the sulfide solid electrolyte comprises sulfur and lithium, and further comprises phosphorus (P), silicon (Si), boron (B), aluminum (Al), germanium (Ge), zinc (Zn), gallium (Ga), indium (In), a halogen element, or a combination thereof.

9. The positive electrode for a lithium-ion secondary battery of claim 1, wherein the sulfide solid electrolyte comprises lithium sulfide; and silicon sulfide, phosphorus sulfide, boron sulfide, or a combination thereof.

10. A lithium-ion secondary battery comprising:
a positive electrode layer comprising a positive electrode particle comprising
  a positive active material comprising a lithium salt, and
  a coating layer comprising an amorphous carbonaceous layer on a surface of the positive active material;
a negative electrode layer comprising a negative active material; and
a sulfide solid electrolyte layer disposed between the positive electrode layer and the negative electrode layer, wherein the sulfide solid electrolyte layer comprises a sulfide solid electrolyte comprising a solid sulfide,
wherein the coating layer comprises a diamond-like carbon,
wherein the coating layer comprises hydrogen atoms, and
wherein an amount of the hydrogen atoms is in the range of about 1 atomic percent to about 50 atomic percent, based on a total content of the coating layer.

11. The lithium-ion secondary battery of claim 10, wherein the coating layer comprises a deposition product of an aliphatic hydrocarbon, an aromatic hydrocarbon, or a combination thereof.

12. The lithium-ion secondary battery of claim 10, wherein the coating layer comprises a deposition product of acetylene, methane, benzene, toluene, xylene, naphthalene, cyclohexane, or a combination thereof.

13. The lithium-ion secondary battery of claim 10, wherein the coating layer comprises a deposition product of an alicyclic hydrocarbon of the formula $C_{4n+6}H_{4n+12}$, where n is a positive integer.

14. The lithium-ion secondary battery of claim 10, wherein the coating layer consists of the diamond-like carbon.

15. The lithium-ion secondary battery of claim 10, wherein the coating layer comprises $sp^2$ hybridized carbon atoms and $sp^3$ hybridized carbon atoms, and a content of the $sp^3$ hybridized carbon atoms in the coating layer is in the range of about 10% to about 100%, based on a total carbon content of the coating layer.

16. The lithium-ion secondary battery of claim 10, wherein the positive active material comprises a lithium salt of a transition metal oxide having a layered rock-salt type structure.

17. The lithium-ion secondary battery of claim 16, wherein the lithium salt of the transition metal oxide having a layered rock-salt type structure is $LiNi_xCo_yAl_zO_2$ or $LiNi_xCo_yMn_zO_2$, where $0<x<1$, $0<y<1$, $0<z<1$, and $x+y+z=1$.

18. The lithium-ion secondary battery of claim 10, wherein the sulfide solid electrolyte comprises sulfur and lithium, and further comprises phosphorus (P), silicon (Si), boron (B), aluminum (Al), germanium (Ge), zinc (Zn), gallium (Ga), indium (In), a halogen element, or a combination thereof.

19. The positive electrode for a lithium-ion secondary battery of claim 1, wherein a content of $sp^3$ hybridized carbon atoms in the coating layer is in a range of about 30% to about 70%, based on a total carbon content of the coating layer.

20. The positive electrode for a lithium-ion secondary battery of claim 19, wherein a ratio of the $sp^2$ hybridized carbon atoms to $sp^3$ hybridized carbon atoms in the coating layer is in a range of about 40:60 to about 60:40, based on a total carbon content of the coating layer.

21. The positive electrode for a lithium-ion secondary battery of claim 1, wherein the coating layer consists of the diamond-like carbon.

* * * * *